United States Patent
Yamane et al.

(10) Patent No.: US 12,325,365 B2
(45) Date of Patent: *Jun. 10, 2025

(54) VEHICULAR INTERIOR COMPONENT

(71) Applicant: TOYOTA BOSHOKU KABUSHIKI KAISHA, Aichi-ken (JP)

(72) Inventors: Ryo Yamane, Aichi-ken (JP); Kosuke Tamaki, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 628 days.

This patent is subject to a terminal disclaimer.

(21) Appl. No.: 17/751,276

(22) Filed: May 23, 2022

(65) Prior Publication Data

US 2022/0388460 A1 Dec. 8, 2022

(30) Foreign Application Priority Data

Jun. 3, 2021 (JP) .................. 2021-093360

(51) Int. Cl.
- *B60R 13/00* (2006.01)
- *B60R 13/02* (2006.01)
- *B60N 2/75* (2018.01)

(52) U.S. Cl.
CPC ...... *B60R 13/0243* (2013.01); *B60R 13/0206* (2013.01); *B60N 2/78* (2018.02); *B60R 2013/0287* (2013.01)

(58) Field of Classification Search
CPC ............ B32B 2307/21; B32B 2605/003; B60J 5/0469; B60J 5/0481; B60J 5/0484;
(Continued)

(56) References Cited

U.S. PATENT DOCUMENTS

| 11,987,105 B2 * | 5/2024 | Yamane | ................ B32B 27/065 |
| 12,252,076 B2 * | 3/2025 | Yamane | ................ B60R 16/06 |
| 2023/0091162 A1 * | 3/2023 | Yamane | ................ B60J 5/0469 |
| | | | 296/146.7 |

FOREIGN PATENT DOCUMENTS

| JP | 9-39131 | 2/1997 |
| JP | 2019-084838 | 6/2019 |

OTHER PUBLICATIONS

Japan Office Action issued in Japan Patent Application No. 2021-93360, mailed Jul. 23, 2024, together with English translation thereof.

* cited by examiner

*Primary Examiner* — Steven O Douglas
(74) *Attorney, Agent, or Firm* — Greenblum & Bernstein, P.L.C.

(57) ABSTRACT

A vehicular interior component to be mounted on a vehicular metal member includes a wall member and a skin disposed on a portion of the wall member. The wall member includes a wall body portion having a plate shape and a mounting portion that extends from the wall body portion and along the vehicular metal member and is to be fixed to the vehicular metal member. The skin includes an electricity removal surface layer having static dissipative properties on a surface of the skin facing a vehicular exterior side. The skin includes a skin body portion that covers the wall body portion and a skin extended portion that extends from the skin body portion and covers a portion of the mounting portion. The electricity removal surface layer of the skin extended portion is to be directly contacted with the vehicular metal member.

14 Claims, 13 Drawing Sheets

(58) Field of Classification Search
CPC ... B60N 2/78; B60N 2/79; B60N 3/02; B60N 3/79; B60R 13/02; B60R 13/0206; B60R 13/0237; B60R 13/0243; B60R 2013/0287

See application file for complete search history.

VEHICULAR INTERIOR COMPONENT

CROSS REFERENCE TO RELATED APPLICATION

This application claims priority from Japanese Patent Application No. 2021-93360 filed on Jun. 3, 2021. The entire contents of the priority application are incorporated herein by reference.

TECHNICAL FIELD

The present technology described herein relates to a vehicular interior component.

BACKGROUND

A vehicular interior component having a function of removing static electricity has been known. As an example of such a vehicular interior component, the pocket member of a door panel is known. The pocket member includes an electrically conductive portion having a holding surface that is touched by a passenger's hand and the electrically conductive portion is made of electrically conductive resin. The electrically conductive portion is electrically connected to a metal panel that is a body of a vehicle. With such a configuration, static electricity charged in the passenger is discharged to the vehicle when the passenger touches the holding surface.

SUMMARY

In the above configuration, a metal bracket for firmly supporting the pocket member is disposed on the electricity transfer route that extends from the electrically conductive resin to the metal panel. The electrically conductive connection between the metal bracket and the metal panel is established by screwing a fixing member (a grommet) whose diameter is deformable to be larger into a fixing hole in the metal panel. With the fixing member being made of electrically conductive resin, the electrically conductive connection between the metal bracket and the metal panel can be surely established via a side surface of the fixing hole without scratching coating of the metal panel. However, such a static electricity removal configuration requires multiple components and a special fixing member having electrically conductive properties in addition to the component of the pocket member. This increases the number of components and a cost.

An object of the present technology described herein is to provide a vehicular interior component that achieves a new static electricity removal configuration.

To solve the above problems, a vehicular interior component according to the technology described herein is to be mounted on a vehicular metal member and includes a wall member and a skin disposed on a portion of the wall member. The wall member includes a wall body portion having a plate shape and a mounting portion that extends from the wall body portion and along the vehicular metal member and is to be fixed to the vehicular metal member. The skin includes an electricity removal surface layer having static dissipative properties on a surface of the skin facing a vehicular exterior side. The skin includes a skin body portion that covers the wall body portion and a skin extended portion that extends from the skin body portion and covers a portion of the mounting portion. The electricity removal surface layer of the skin extended portion is to be directly contacted with the vehicular metal member.

DETAILED DESCRIPTION

First Embodiment

Figure 1:
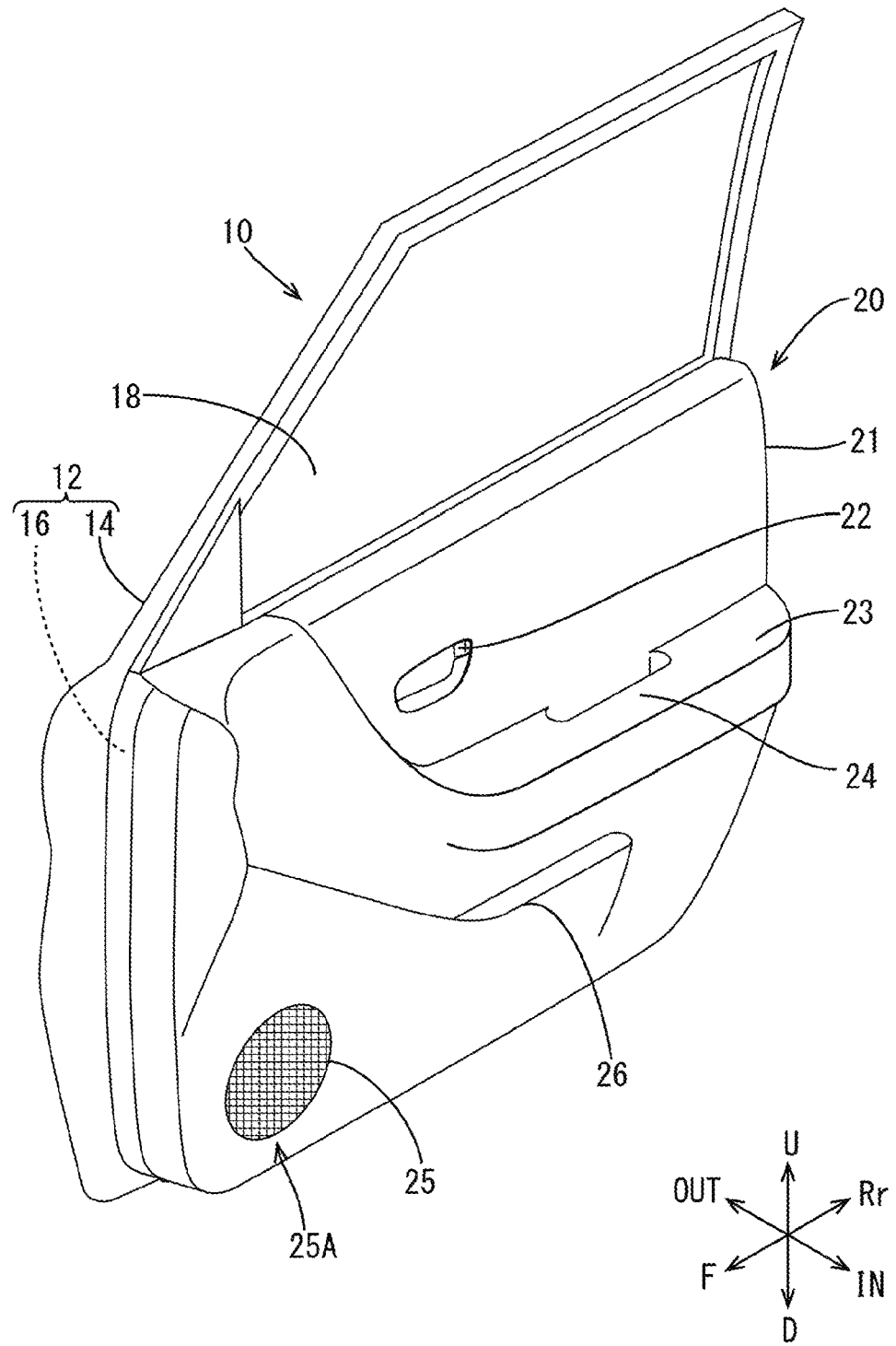
FIG. 1 is a perspective view of a vehicular door including a pull handle member according to one embodiment.

A door trim 20 and a trim board 21 will be described with reference to FIGS. 1 to 11. The door trim 20 in FIG. 1 is included in a right door 10 of a vehicle and a left door also includes a door trim having the similar configuration. The symbols of F, Rr, U, D, IN, and OUT illustrated in each drawing represent a front side and a rear side with respect to a vehicular forwarding direction, an upper side and a lower side with respect to the vertical direction (an upper-bottom direction), a vehicular interior side and a vehicular exterior side, respectively. The directions are defined for certain convenience and are not limited to those described in the drawings.

Figure 2:
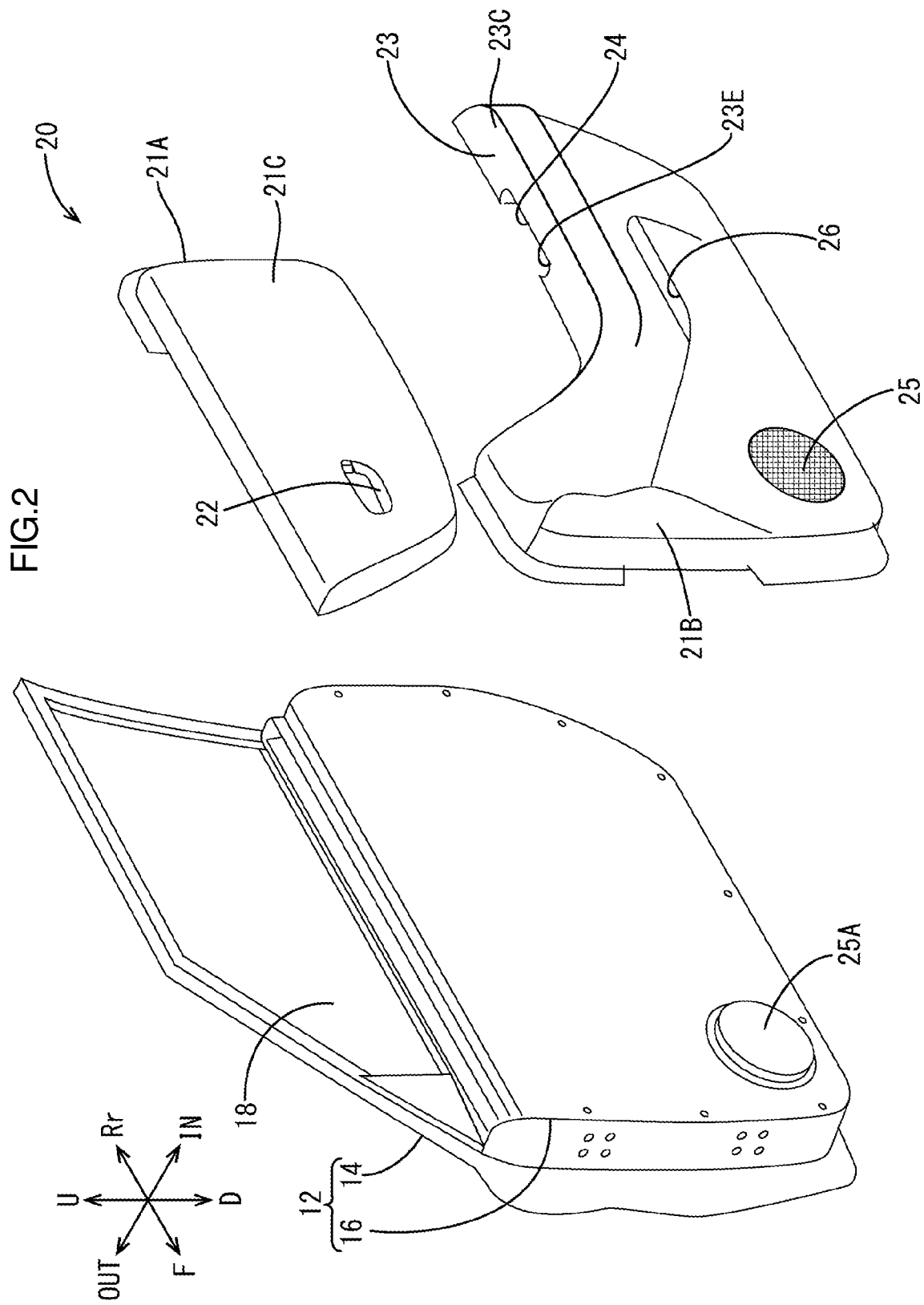
FIG. 2 is an exploded view of the vehicular door illustrated in FIG. 1.
Figure 6:
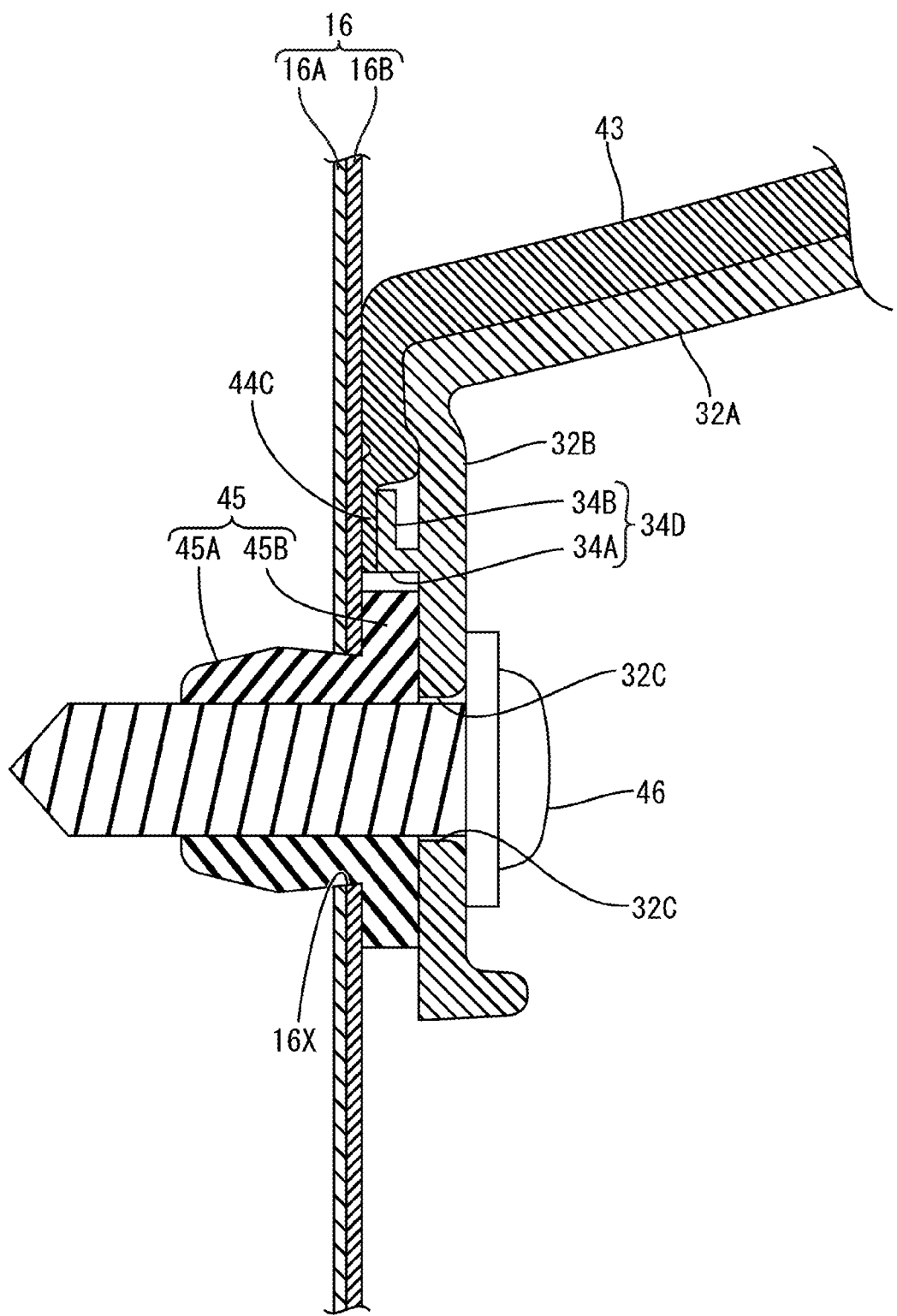
FIG. 6 is a cross-sectional view taken along VI-VI line in FIG. 5.

As illustrated in FIGS. 1 and 2, the door trim 20 described herein is mounted on a vehicular interior side with respect to a door panel 12 of a vehicular door 10. The door trim 20 is configured as a wall surface of a vehicular compartment for improving appearance of the vehicular compartment and increasing comfort in the vehicular compartment. The door panel 12 includes a door outer panel 14 and a door inner panel 16 that have a plate shape and each of which is formed by pressing a metal panel made of steel or aluminum. Various components such as a speaker 25A and a lifting and lowering mechanism for lifting and lowering a window glass 18 are arranged between the door inner panel 16 and the door outer panel 14. As illustrated in FIG. 6, the door inner panel 16 includes a metal base member 16A and a coating layer 16B on an entire area of a vehicular interior surface of the metal base member 16A. The coating layer 16B is provided with electrically insulating coating. In the drawings other than FIG. 6, although the metal base member 16A and the coating layer 16B are not illustrated, the door inner panel 16 has a similar configuration.

The door trim 20 includes various vehicular interior components such as an inside handle 22, an armrest 23, a door pull handle 24, a speaker grill 25 that covers the speaker 25A, and a door pocket 26. The door trim 20 includes the trim board 21 having a plate shape. The trim board 21 includes an upper trim 21A and a lower trim 21B. The lower trim 21B includes board members that are fitted to each other. A vehicular interior component may be mounted on the board member or some of the board members may be fitted together to be configured as a vehicular interior component. The upper trim 21A and the lower trim 21B are made of synthetic resin material having electrical insulating properties such as polypropylene and are covered with a skin 21C for improving feel of material and sense of touch as needed.

The armrest 23 is one of the vehicular interior components and an occupant who is seated on a seat puts the occupant's arm on the armrest 23. The armrest 23 includes an armrest portion 23A that extends in the front-rear direction in an upper section of the lower trim 21B and projects toward the vehicular interior side. By mounting the armrest portion 23A on the upper trim 21A, the armrest 23 is obtained. The armrest portion 23A includes an arm support surface portion 23B, a skin 23C, and a vehicular interior surface portion 23D. The arm support surface portion 23B faces upward and is covered with the skin 23C. The vehicular interior surface portion 23D supports the arm support surface portion 23B from a lower side with holding the skin 23C between the vehicular interior surface portion 23D and the arm support surface portion 23B.

Figure 4:
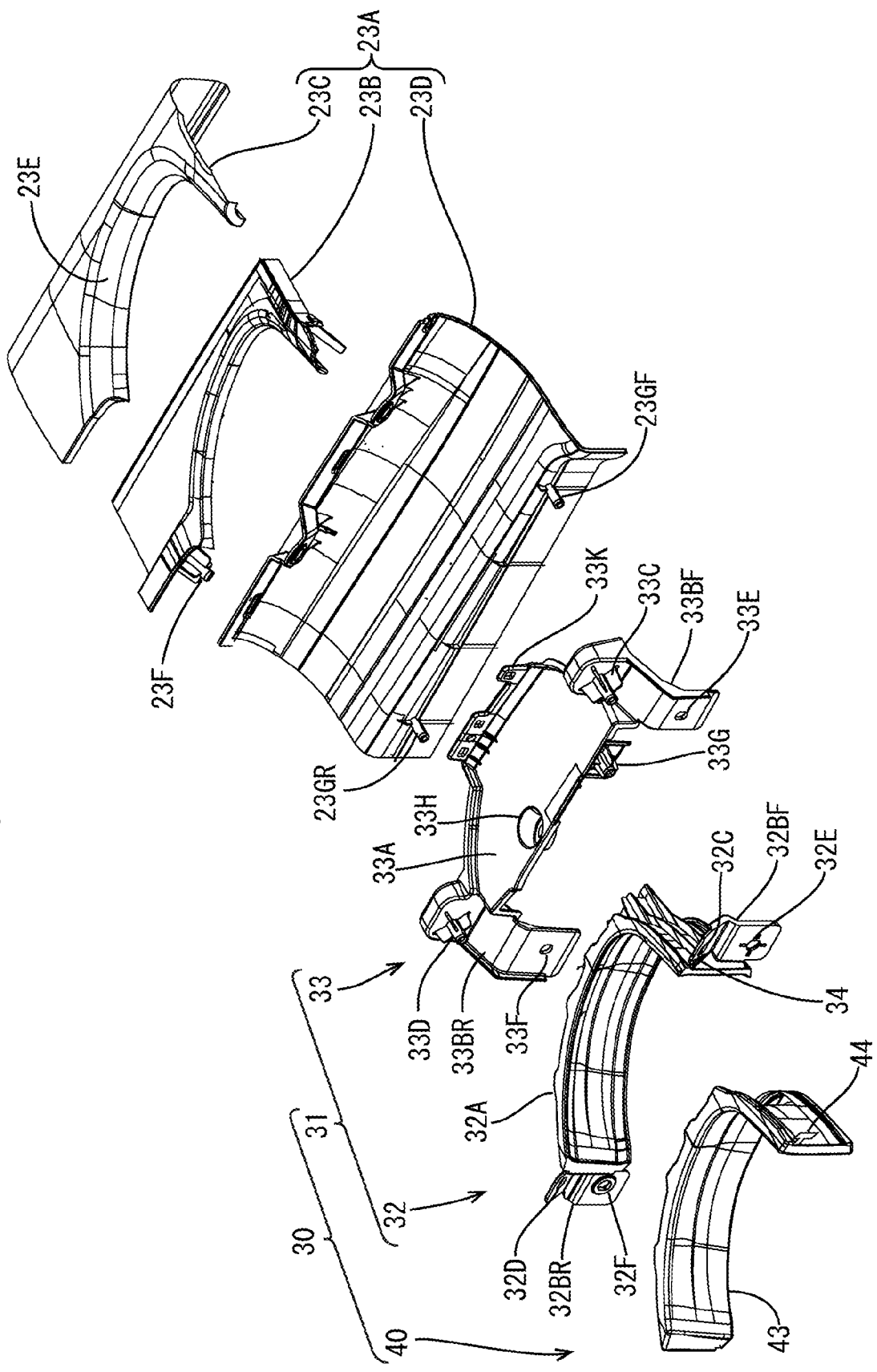
FIG. 4 is an exploded view of the pull handle member illustrated in FIG. 3.

The armrest portion 23A is formed by joining the arm support surface portion 23B and the vehicular interior surface portion 23D together with the surface (the upper surface) of the arm support surface portion 23B being covered with the skin 23C. As illustrated in FIG. 4, mounting bosses 23GF, 23GR having a tubular shape project from a lower section of the vehicular interior surface portion 23D toward the vehicular interior side. The arm support surface portion 23B and the vehicular interior surface portion 23D of the armrest portion 23A are made of synthetic resin having electric insulating properties such as polypropylene. The skin 23C is a layered member that includes a surface layer made of synthetic resin such as vinyl chloride and a foaming resin layer such as polyurethane foam of a sponge form including continuous air bubbles. The configuration of the skin 23C is not limited to the above configuration.

Figure 3:
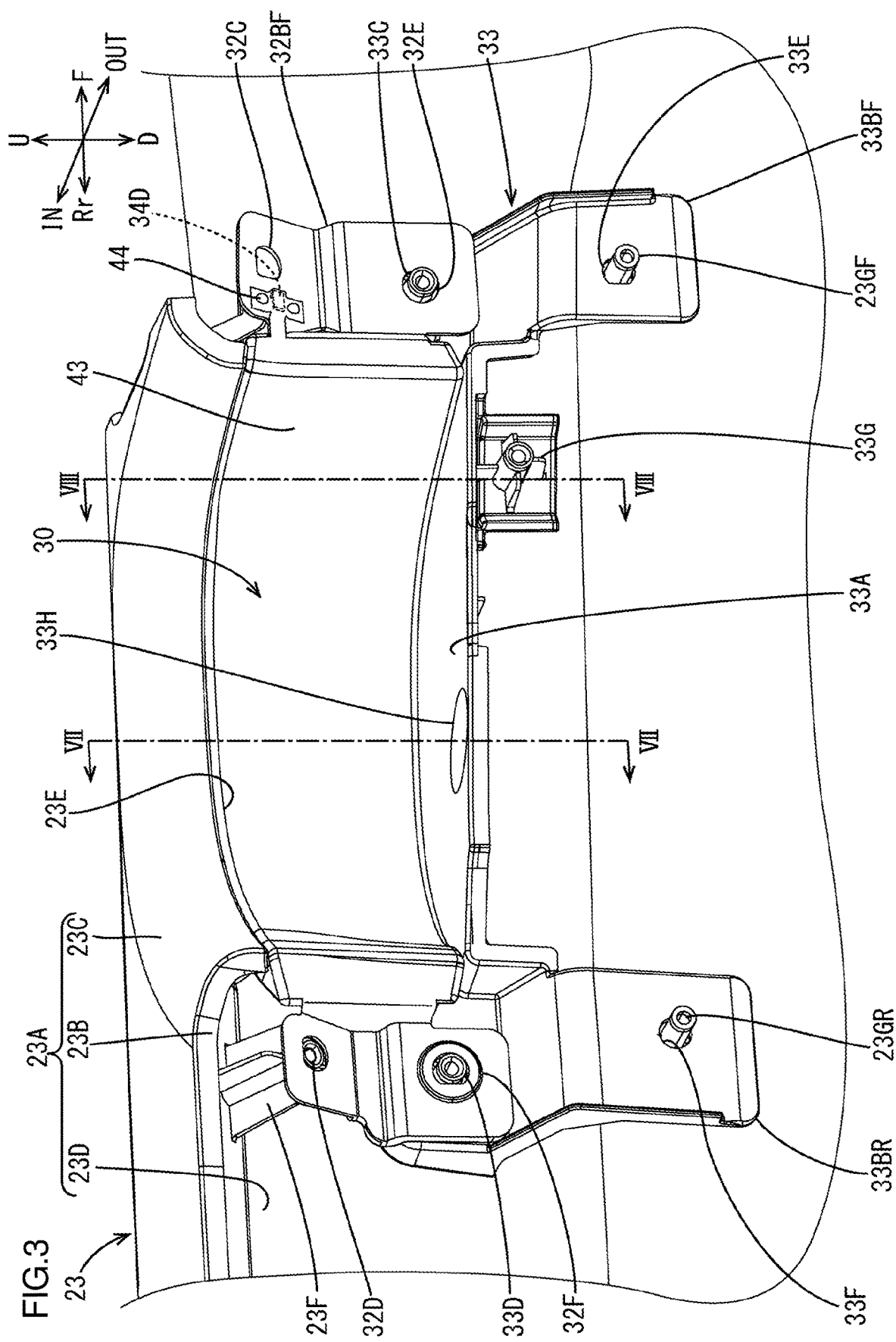
FIG. 3 is a perspective view illustrating the pull handle member seen from a vehicular exterior side.
Figure 7:
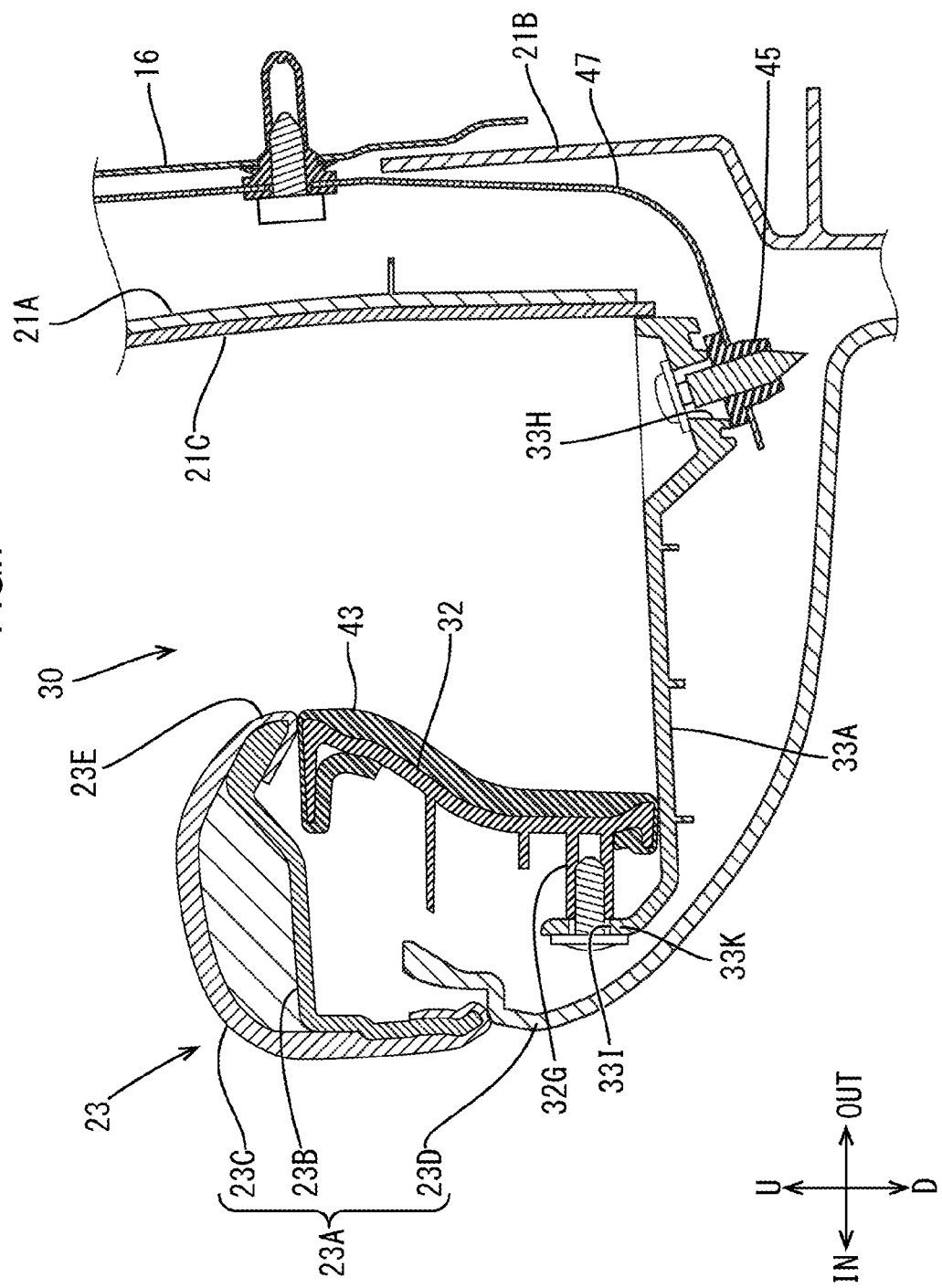
FIG. 7 is a cross-sectional view taken along VII-VII line in FIG. 3.
Figure 8:
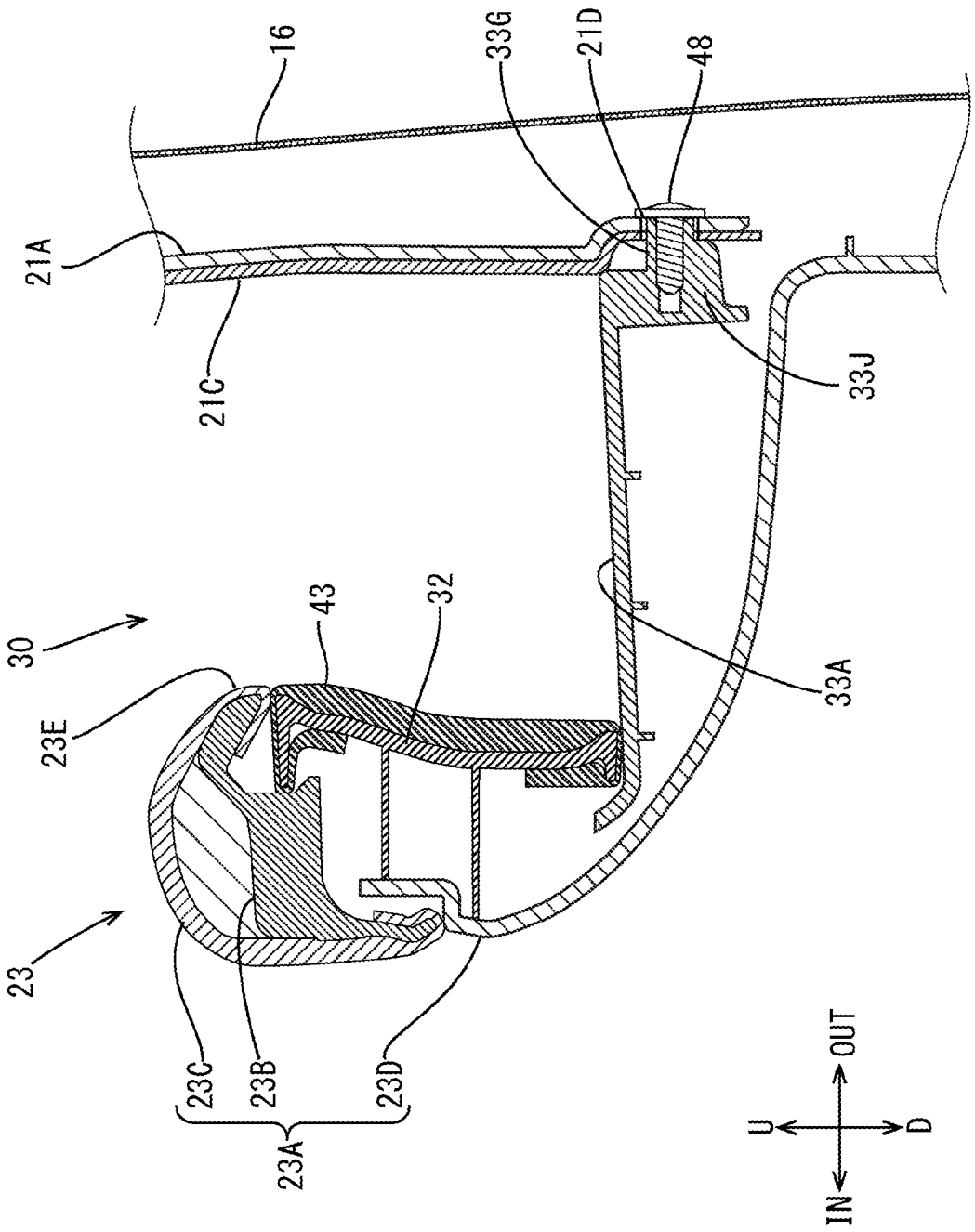
FIG. 8 is a cross-sectional view taken along VIII-VIII line in FIG. 3.

The armrest 23 includes the door pull handle 24 in a middle section of the armrest 23 with respect to the front-rear direction. The door pull handle 24 is recessed in the middle section of the armrest 23. The occupant who is seated on the seat puts the occupant's hand in the door pull handle 24 to open and close the vehicular door 10. As illustrated in FIGS. 2 and 3, an edge of the arm support surface portion 23B close to the upper trim 21A is recessed toward the vehicular interior side at a middle section of the edge of the arm support surface portion 23B to form an opening 23E of the door pull handle 24 in the arm support surface portion 23B. As illustrated in FIGS. 7 and 8, the door pull handle 24 has the opening 23E between the upper trim 21A and the arm support surface portion 23B. The door pull handle 24 includes a pull handle member 30 (a vehicular interior component) between the upper trim 21A and the arm support surface portion 23B. The pull handle member 30 is disposed between the armrest 23 and the upper trim 21A.

The pull handle member 30 is fixed to the upper trim 21A and the armrest portion 23A to form a box shape that opens upward with the opening 23E. As illustrated in FIG. 4, the pull handle member 30 includes a body member 31 and a skin 40 that is put on an inner surface side of the body member 31 to be opposite the upper trim 21A. The body member 31 includes a side wall member 32 and a bottom member 33. The side wall member 32 has a vehicular exterior side surface that is configured as an inner wall surface of the pull handle member 30. The skin 40 is disposed on the vehicular exterior side surface of the side wall member 32. The bottom member 33 has a bottom surface that is configured as a bottom surface of the pull handle member 30. The body member 31 is made of synthetic resin having electrical insulating properties such as polypropylene. For example, the body member 31 may be configured without including any material having static dissipative properties.

As illustrated in FIG. 4, the side wall member 32 includes a side wall body portion 32A, a front side wall mount portion 32BF, and a rear side wall mount portion 32BR. The side wall body portion 32A has two opposing long edges and two opposing short edges. A lower long edge of the side wall body portion 32A is disposed on the bottom member 33. The side wall body portion 32A is an arched thin plate. The front side wall mount portion 32BF and the rear side wall mount portion 32BR extend from a front-side short edge and a rear-side short edge of the side wall body portion 32A in a front-rear direction, respectively. Each of the front side wall mount portion 32BF and the rear side wall mount portion 32BR is a plate member. The vehicular exterior side surface of the side wall body portion 32A that is opposite the upper trim 21A is covered with the skin 40 (a skin body portion 43). As illustrated in FIG. 7, the side wall body portion 32A includes mounting bosses 32G (three mounting bosses in this embodiment) in a middle section of the side wall body portion 32A with respect to the front-rear direction. The mounting bosses 32G have a tubular shape and project from a vehicular interior side surface of the side wall body portion 32A toward the vehicular interior side. The front side wall mount portion 32BF includes an upper through hole 32C and a lower through hole 32E and the rear side wall mount portion 32BR includes an upper through hole 32D and a lower through hole 32F. As illustrated in FIGS. 3 and 4, upper portions of the front side wall mount portion 32BF and the rear side wall mount portion 32BR including the respective upper through holes 32C and 32D are bent toward the vehicular exterior side.

Figure 5:
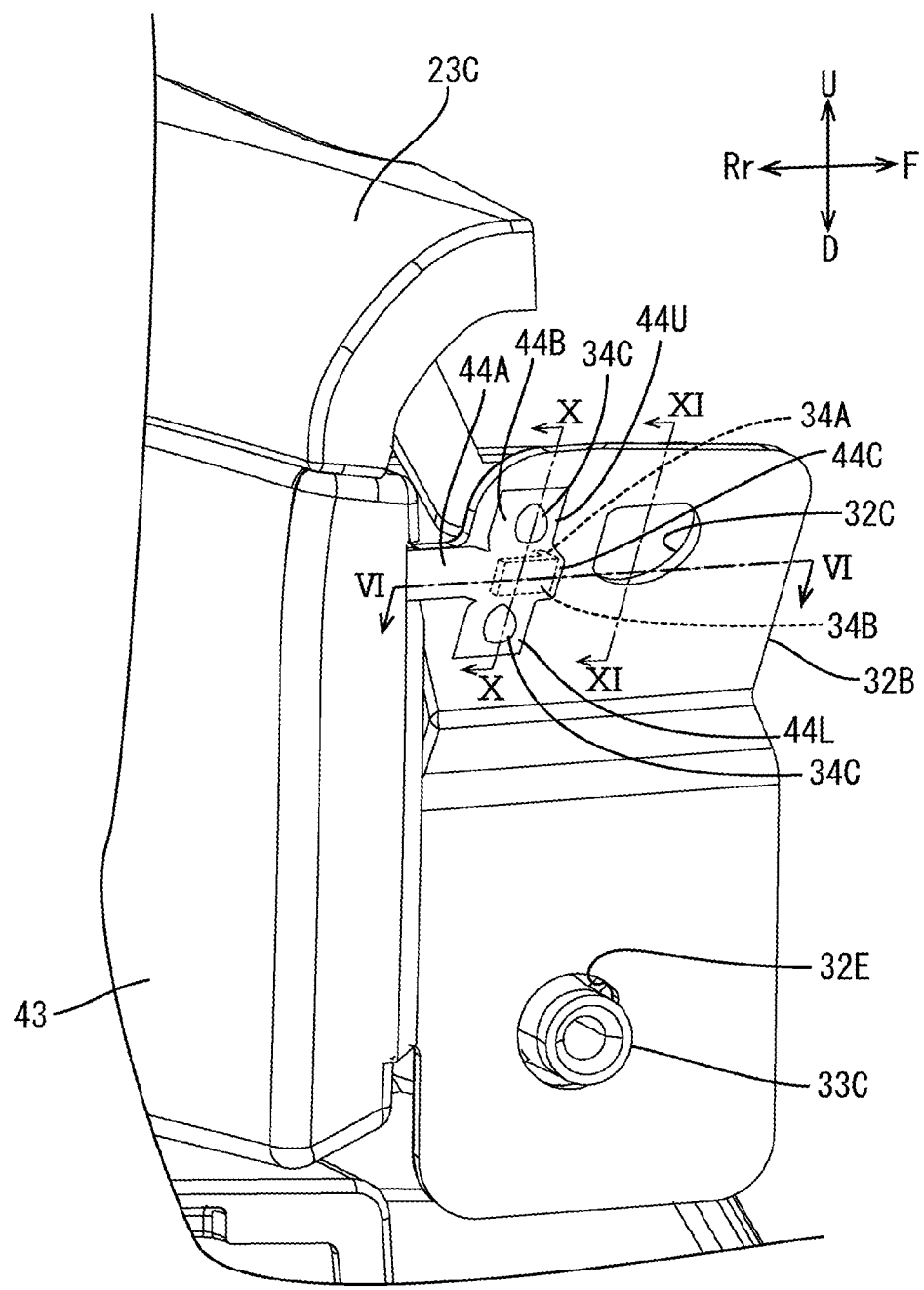
FIG. 5 is a perspective view of a portion of the pull handle member including a skin extended portion of a skin.

As illustrated in FIGS. 5 and 6, the front side wall mount portion 32BF includes a mount base portion 32B having a plate shape and a contact presser 34. The contact presser 34 projects from the vehicular exterior side surface of the mount base portion 32B toward the vehicular exterior side and is on the vehicular rear side with respect to the upper through hole 32C. The contact presser 34 is included integrally with the mount base portion 32B. The contact presser 34 includes a body portion 34D having a L-shaped cross section. The body portion 34D includes a base section 34A and a contact section 34B. The base section 34A projects from the vehicular exterior side surface of the mount base portion 32B of the front side wall mount portion 32BF toward the vehicular exterior side. The contact section 34B extends rearward from the base section 34A along the mount base portion 32B. Specifically, the contact section 34B is slightly inclined toward the vehicular exterior side as it extends rearward. In other words, the contact section 34B is inclined such that the contact section 34B is closer to the door inner panel 16 as it extends rearward. The contact section 34B is deformable in the vehicular interior-exterior direction. The contact presser 34 further includes stopper portions 34C that are disposed on an upper side and a lower side with respect to the contact section 34B in the upper-bottom direction. The stopper portions 34C includes base portion projecting from the mount base portion 32B and hook portions that are at projected ends of the base portions.

As illustrated in FIG. 4, the bottom member 33 includes a bottom body portion 33A, a front side bottom mount portion 33BF, and a rear side bottom mount portion 33BR. The bottom body portion 33A is a semicircular plate. The front side bottom mount portion 33BF and the rear side bottom mount portion 33BR are plate members that extend from the bottom body portion 33A. The front side bottom mount portion 33BF and the rear side bottom mount portion 33BR are on the front side and the rear side with respect to the bottom body portion 33A, respectively. The bottom body portion 33A is a plate member and has a wide area at a middle section with respect to the front-rear direction. As illustrated in FIG. 7, the bottom member 33 includes a bottom mount portion 33K in a middle section thereof in the front-rear direction and the bottom mount portion 33K extends upward from a vehicular interior edge of the bottom body portion 33A. The bottom mount portion 33K includes through holes 33I (three through holes 33I in this embodiment).

The front side bottom mount portion 33BF and the rear side bottom mount portion 33BR extend along the front side wall mount portion 32BF and the rear side wall mount portion 32BR of the side wall member 32 when the side wall member 32 and the bottom member 33 are fitted together. The front side bottom mount portion 33BF and the rear side bottom mount portion 33BR include mounting bosses 33C, 33D, respectively, at positions corresponding to the lower through holes 32E, 32F in the side wall member 32. The mounting bosses 33C, 33D have a tubular shape projecting toward the vehicular exterior side. As illustrated in FIGS. 3 and 4, the front side bottom mount portion 33BF and the rear side bottom mount portion 33BR are bent such that lower sections of the front side bottom mount portion 33BF and the rear side bottom mount portion 33BR that are lower than the mounting bosses 33C, 33D protrude toward the vehicular exterior side and extend along the lower edge section of the vehicular interior surface portion 23D of the armrest portion 23A. The front side bottom mount portion 33BF and the rear side bottom mount portion 33BR include through holes 33E, 33F at positions corresponding to the mounting bosses 23GF, 23GR of the vehicular interior surface portion 23D.

As illustrated in FIG. 7, with the side wall body portion 32A being covered with the skin 40 (the skin body portion 43), the mounting bosses 32G of the side wall member 32 are inserted in the through holes 33I in the bottom member 33 and the mounting bosses 33C, 33D of the bottom member 33 are inserted in the lower through holes 32E, 32F in the side wall member 32. Then, the distal ends of the mounting bosses 33C, 33D are subjected to thermal caulking and the side wall member 32 and the bottom member 33 are integrally connected to each other. Thus, the pull handle member 30 is obtained.

A fixing member is screwed to the tubular mounting boss 23F of the arm support surface portion 23B through the upper through hole 32D in the rear side wall mount portion 32BR of the side wall member 32 and the side wall member 32 is fixed to the arm support surface portion 23B. The mounting bosses 23GF, 23GR of the vehicular interior surface portion 23D are inserted through the lower through holes 33E, 33F in the bottom member 33, respectively, and the pull handle member 30 is disposed in a predefined position with respect to the armrest portion 23A.

As illustrated in FIG. 6, a fixing member 46 is inserted through the upper through hole 32C of the front side wall mount portion 32BF of the side wall member 32 from the vehicular interior side and the side wall member 32 is fixed directly to the door inner panel 16 with the fixing member 46. More specifically, the door inner panel 16 includes a through hole 16X at the fixing position with the fixing member 46 and a grommet 45 that is made of synthetic resin having electrical insulating properties is fitted in the through hole 16X. The grommet 45 includes a tubular section 45A and a flange section 45B. The tubular section 45A has a tubular shape and is fitted in the through hole 16X. The flange section 45B extends outward in a radial direction from the tubular section 45A and is at the vehicular interior side end of the tubular section 45A. The flange section 45B extends along a hole edge section of the through hole 16X when the tubular section 45A is inserted in the through hole 16X. An inner diameter of the grommet 45 is smaller than the outer diameter of a screw portion of the fixing member 46. Therefore, with the fixing member 46 being inserted through the upper through hole 32C and screwed to the grommet 45, the fixing member 46 pushes the tubular section 45A to expand the inner diameter of the tubular section 45A and the fixing member 46 is firmly fixed to the door inner panel 16 via the grommet 45. Accordingly, the side wall member 32 is firmly fixed to the door inner panel 16.

As illustrated in FIGS. 4 and 7, the bottom body portion 33A of the bottom member 33 includes a screw hole 33H and the bottom member 33 is fixed to a Metal bracket 47 having an L-shape with a screw that is inserted through the screw hole 33H. The bracket 47 is fixed to the door inner panel 16, Accordingly, the pull handle member 30 is firmly supported by the door inner panel 16 via the bracket 47. As illustrated in FIGS. 4 and 8, the bottom body portion 33A includes a mount portion 33J that extends downward along the upper trim 21A from a vehicular exterior side edge of the bottom body portion 33A. The mount portion 33J includes a mounting boss 33G that has a tubular shape and projects from the mount portion 33J toward the vehicular exterior side. The mounting boss 33G is inserted in a through hole 21D in the upper trim 21A and a mounting screw 48 is screwed into the mounting boss 33G to fix the pull handle member 30 to the upper trim 21A.

Figure 9:
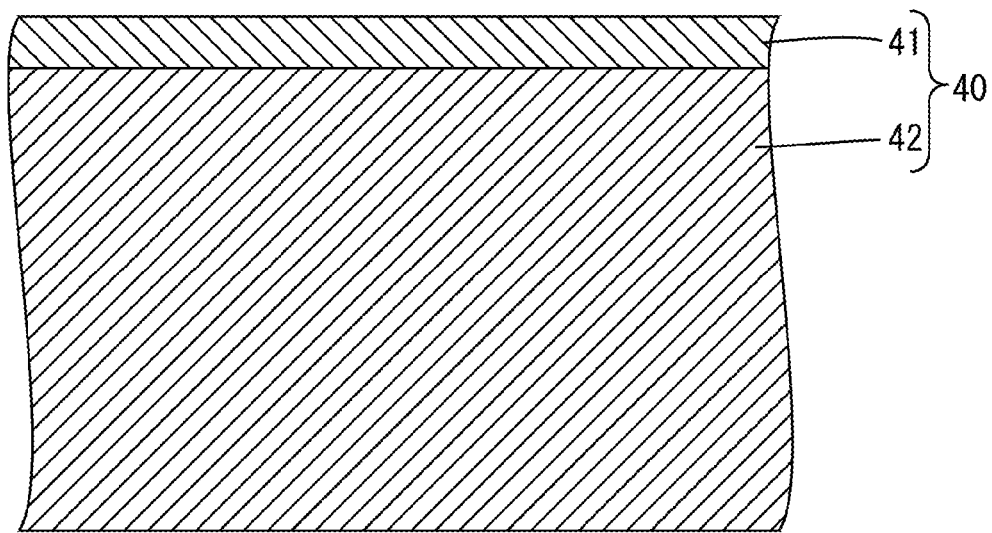
FIG. 9 is a cross-sectional view of the skin.

The skin 40 is an interior lining member on the pull handle member 30. The skin 40 is disposed on the side wall member 32 to cover a portion of a surface of the side wall member 32. The skin 40 is configured as a contact surface that is to be touched by a vehicle occupant when the occupant closes and opens the door 10. The skin 40 is for providing the side wall member 32 with static dissipative properties. The skin 40 is also for improving outer appearance design of the side wall member 32 and providing the side wall member 32 with high quality sense of touch. As illustrated in FIG. 9, the skin 40 includes an electricity removal surface layer 41 that has the static dissipative properties and an elastic layer 42 that has elasticity and is not electrically conductive. The electricity removal surface layer 41 is disposed on the elastic layer 42 and the skin 40 has an integrally layered structure. The skin 40 further includes an adhesive layer on a back surface of the elastic layer 42 and is able to adhere to the side wall member 32. The skin 40 is disposed on the side wall member 32 such that the elastic layer 42 is opposite the side wall member 32. The skin 40 is attached to the surface of the side wall member 32 such that the electricity removal surface layer 41 faces the inner space of the pull handle member 30 and the upper trim 21A.

Examples of the electricity removal surface layer 41 include a fabric skin such as woven fabric, non-woven fabric, and knitted fabric each of which is provided with the static dissipative properties by including electrically conductive fibers made of metal or carbon, a synthetic skin that is made of synthetic resin provided with the static dissipative properties by including electrically conductive fibers or electrically conductive fine particles, and a resin sheet that is provided with the static dissipative properties by having an appropriate polymer structure. The electricity removal surface layer 41 of this embodiment is an electrically conductive fabric skin that is made of a knitted fabric obtained by knitting together with the electrically conductive fibers.

The elastic layer 42 may include elastic material that can achieve desired flexibility and may preferably include foaming resin such as urethane foam of a sponge form including continuous bubbles. The elastic layer 42 may have the static dissipative properties similar to the electricity removal surface layer 41. However, in a practical view, the foaming resin having good flexibility is less likely to have the static dissipative properties due to a porous structure thereof.

In this embodiment, when a component has the static dissipative properties, the surface resistance (Rs: $\Omega/\square$) of the component satisfies the formula: $1\times10^4 \leq Rs < 1\times10^{12}$, and more specifically, the formula: $1\times10^5 \leq Rs < 1\times10^{11}$. The surface resistance Rs is defined based on IEC 61340-2-3: 20001. If the surface resistance of the component is within the above range and a person who is charged with static electricity touches a surface of the component, the static electricity charged in the person can be slowly dissipated to the component without applying any pain or shock to the person and the static electricity is removed from the person's body.

When a component is electrically conductive in the technology described herein, the surface resistance (Rs: $\Omega/\square$) of the component may satisfy the formula: $Rs < 1\times10^{12}$, and typically, the formula: $Rs < 1\times10^{14}$, and specifically, the formula: $Rs \leq 1\times10^{-2}$. The volume resistivity defined based on JIS K 7194 is typically equal to or smaller than $10^5$ acne, preferably equal to or smaller than 10 $\Omega$cm, more preferably equal to or smaller than $10^{-1}$ $\Omega$cm, and, for example, equal to or smaller than $10^{-6}$ $\Omega$cm.

When a component has the electrical insulating properties, the surface resistance (Rs: $\Omega/\square$) of the component satisfies the formula: $10^{12} \leq Rs$, and the volume resistivity is equal to or greater than $10^6$ $\Omega$cm, and typically equal to or greater than $10^8$ $\Omega$cm, and for example, equal to or greater than $10^{10}$ $\Omega$cm.

As illustrated in FIGS. 3, 5, 10, and 11, the skin 40 includes the skin body portion 43 that covers the side wall body portion 32A and a skin extended portion 44 that extends frontward from the skin body portion 43. The skin body portion 43 is a main portion of the skin 40 and covers the side wall body portion 32A. The skin 40 includes extra portions, which are to be folded, at an upper edge portion and a lower edge portion thereof, respectively, and the skin 40 is greater than the side wall body portion 32A by the extra portions. The upper and lower extra portions of the skin 40 are folded behind the side wall body portion 32A and are bonded to the back surface (the vehicular interior side surface) of the side wall body portion 32A with adhesive. The skin 40 includes extra portions at a front edge portion and a rear edge portion thereof, respectively, and the skin 40 is greater than the side wall body portion 32A by the extra portions and the front and rear side surfaces. The front and rear extra portions of the skin 40 are folded behind and on the side surfaces of the side wall body portion 32A and are bonded to the back surface (the vehicular interior side surface) and the side surfaces of the side wall body portion 32A with adhesive. Accordingly, the peripheral edges (edge surfaces) of the side wall member 32 are covered with the skin 40 and this improves outer appearance.

Figure 10:
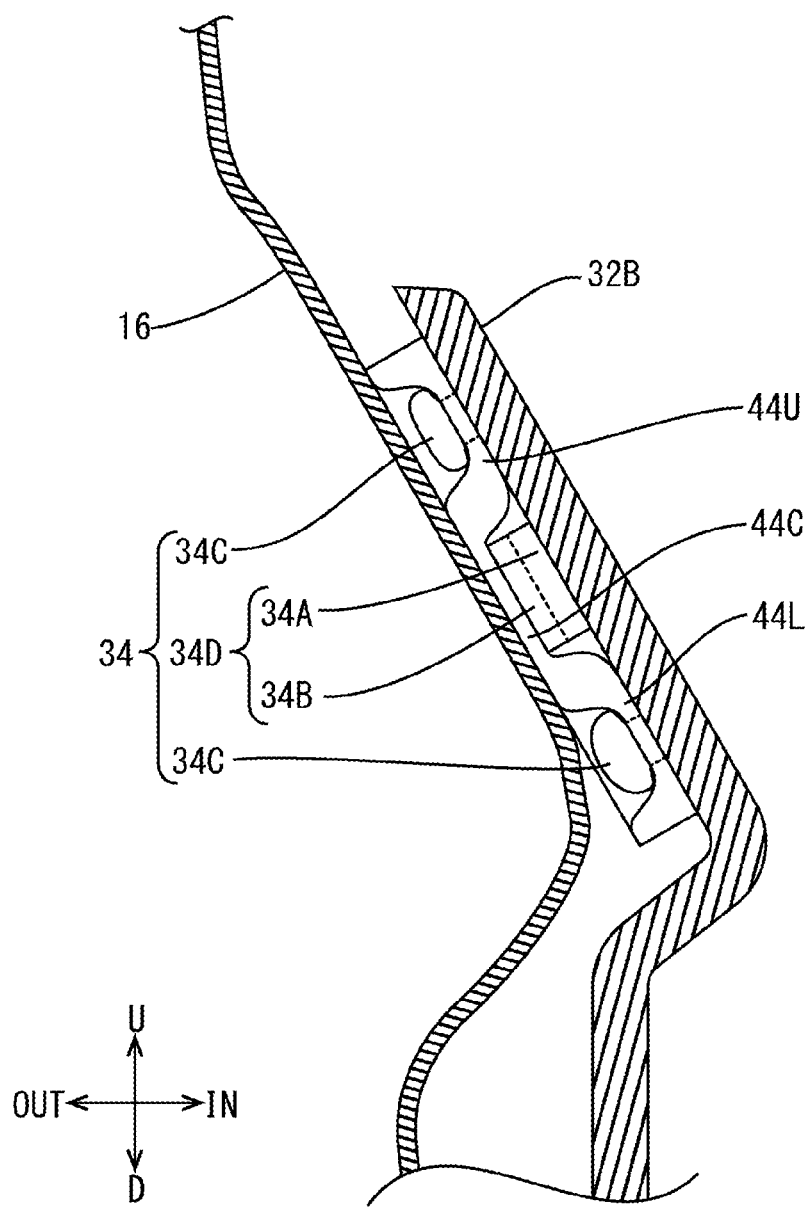
FIG. 10 is a cross-sectional view taken along X-X line in FIG. 5.
Figure 11:
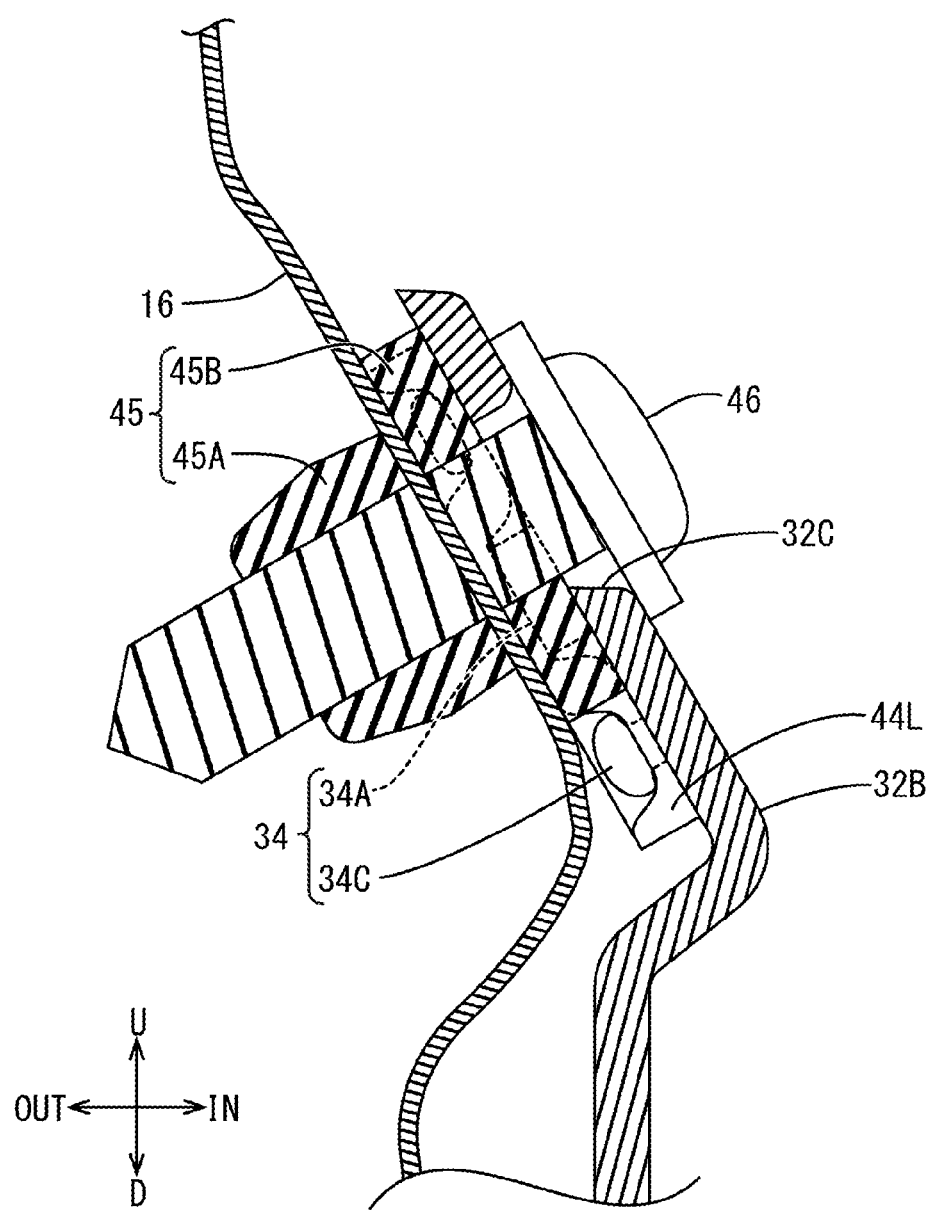
FIG. 11 is a cross-sectional view taken along XI-XI line in FIG. 5.

The skin extended portion 44 extends frontward from the skin body portion 43 to the vicinity of the through hole 32C in the front side wall mount portion 32BE The skin extended portion 44 overlaps the contact presser 34 that is near the through hole 32C. More specifically, as illustrated in FIG. 5, the skin extended portion 44 has a T-shape and includes a base section 44A and a wide section 448. The base section 44A extends from the skin body portion 43 and the wide section 44B is continuous from the base section 44A and wider than the base section 44A. The wide section 44B extends in the upper-bottom direction and includes an upper section 44U, a lower section 44L, and an overlapping section 44C that is between the upper section 44U and the lower section 44L. As illustrated in FIG. 10, the overlapping section 44C overlaps the contact section 348 of the contact presser 34 and is on a vehicular exterior side surface of the contact section 34B, The plate surface of the contact section 34B is contacted with the overlapping section 44C and the overlapping section 44C is contacted with the door inner panel 16. The upper section 44U and the lower section 44L include cuts, respectively, and the hook portions of the stopper portions 34C are inserted through the respective cuts to fix the skin extended portion 44 to the front side wall mount portion 32BF such that the wide section 44B overlaps the contact presser 34. As illustrated in FIG. 10, the overlapping section 44C of the skin extended portion 44 of the skin 40 projects toward the vehicular exterior side than the surface of the front side wall mount portion 32BF by the projecting dimension of the contact presser 34.

A height of the base section 34A of the contact presser 34 is defined as a projecting dimension of the base section 34A projecting from the surface of the mount base portion 32B of the front side wall mount portion 32BF. The height of the base section 34A is smaller than a thickness of the flange section 45B that is defined as a dimension of the flange section 45B measured in the vehicular interior-exterior direction and a total of the thickness of the skin 40 and the height of the base section 34A is greater than the thickness of the flange section 45B. According to such a configuration, as illustrated in FIG. 10, when the side wall member 32 is mounted on the door inner panel 16, the skin extended portion 44 of the skin 40 is pressed toward the door inner panel 16 by the contact presser 34 of the front side wall mount portion 32BF and the surface of the skin 40 is firmly contacted with the door inner panel 16. The electricity removal surface layer 41 of the skin 40 is directly contacted with the door inner panel 16 while the elastic layer 42 being pressed and deformed in the thickness direction.

According to the above embodiment, the pull handle member 30 (a vehicular interior component) is mounted on the door inner panel 16 (a vehicular metal member) of a vehicle on a vehicular interior side of the door inner panel 16. The pull handle member 30 includes the side wall member 32 having a plate shape and the skin 40 that covers at least a portion (the side wall body portion 32A and the front side wall mount portion 32BF) of the side wall member 32. The side wall member 32 includes the side wall body portion 32A (a mount base portion) and the front side wall mount portion 32BF (a mount portion). The front side wall mount portion 32BF extends from the side wall body portion 32A and along the door inner panel 16, The skin 40 includes the skin body portion 43 and the skin extended portion 44. The skin body portion 43 covers the side wall body portion 32A. The skin extended portion 44 is continuous from the skin body portion 43 and disposed on the front side wall mount portion 32BF. The skin 40 includes the electricity removal surface layer 41 having the static dissipative properties at least on a surface of the skin 40 facing the door inner panel 16. When the pull handle member 30 is mounted on the door inner panel 16 with the skin 40 facing the door inner panel 16, the front side wall mount portion 32BF is fixed to the door inner panel 16 and the electricity removal surface layer 41 of the skin 40 is directly contacted with the door inner panel 16.

The vehicular interior side surface of the metal member such as the door panel is usually provided with coating. The portions of the metal member provided with such coating may be less likely to establish effective electrical connection with another component. Therefore, the portion of the door panel without such coating is electrically connected to a mount portion of a vehicular component, which is to be touched by a passenger, by inserting the mount portion into a mount hole and connecting the mount portion and an inner hole surface of the mount hole. The skin usually covers a portion of the vehicular component that is exposed to the vehicular interior side and does not cover a portion that is not exposed to the vehicular interior side.

However, the metal member such as the door inner panel 16 can be used as a component to be grounded and may include a portion with a coating layer and a portion without the coating layer. Not only the portion without the coating layer but also the portion with the coating layer can be electrically connected to the component storing static electricity with large voltage that makes a human to feel pain when the static electricity flows from the component to the human. Therefore, the pull handle member 30 of this embodiment is configured to remove static electricity stored in the skin body portion 43 of the skin 40 (the contact portion) with the configuration of the electricity removal surface layer 41 being directly contacted with the door inner panel 16. According to such a configuration, regardless of whether or not the coating layer is provided on the vehicular interior side surface of the metal member such as the door inner panel 16, static electricity stored in the contact portion can be removed with the vehicular interior component without changing the configuration of the vehicular interior component.

In this embodiment, as illustrated in FIG. 6, the door inner panel 16 includes the metal base member 16A and the coating layer 16B that has insulating properties and is disposed on a vehicular interior side surface of the metal base member 16A. The skin extended portion 44 of the skin 40 is contacted with the portion of the door inner panel 16 including the coating layer 16B. The configuration for removing static electricity according to the present technology can be applied to the portion of the door inner panel 16 including the coating layer 16B. With the skin 40 being contacted with the portion of the door inner panel 16 including the coating layer 16B, the static electricity stored in the pull handle member 30 can be removed.

In this embodiment, the skin 40 includes the electricity removal surface layer 41 that has the static dissipative properties and the elastic layer 42 that has elasticity. The elastic layer 42 is disposed on the surface of the electricity removal surface layer 41 that is opposite the side wall body portion 32A and the skin 40 has an integrally layered structure. The elastic layer 42 that provides the skin 40 with flexibility is less likely to have sufficient static dissipative properties due to its structure. The elastic layer 42 may be further less likely to have sufficient static dissipative properties as demanded flexibility becomes higher. In the configuration of this embodiment, the skin 40 that includes the electricity removal surface layer 41 only in a front surface section thereof can exert sufficient static dissipative properties. Therefore, the skin 40 can include the elastic layer 42 that provides high flexibility in a back surface section thereof and the skin 40 with sense of soft touch can be obtained. In the pull handle member 30 of this embodiment, sense of touch with high quality and static dissipative properties can be obtained.

In this embodiment, the door inner panel 16 (the vehicular metal member) and the front side wall mount portion 32BF (the mount portion) are disposed away from each other and the front side wall mount portion 32BF includes the contact presser 34 (one example of a projection member) projecting toward the door inner panel 16. The electricity removal surface layer 41 is directly contacted with the door inner panel 16 between the contact presser 34 and the door inner panel 16. According to such a configuration, the projecting dimension of the contact presser 34 can be determined relative to the thickness of the skin 40 such that the skin 40 can be directly contacted with the door inner panel 16. This ensures the contact between the skin 40 and the door inner panel 16.

In this embodiment, the door inner panel 16 and the front side wall mount portion 32BF include the through holes 16X, 32C, respectively, through which the fixing member 46 is inserted to fix the front side wall mount portion 32BF to the door inner panel 16. The grommet 45 is fitted in the through hole 16X in the door inner panel 16. The grommet 45 includes the tubular section 45A and the flange section 45B. The tubular section 45A is to be fitted in the through hole 16X. The flange section 45B extends outward in the radial direction from the tubular section 45A along the vehicular interior side surface of the door inner panel 16.

The front side wall mount portion 32BF includes the mount base portion 32B and the contact presser 34 that projects from the mount base portion 32B toward the door inner panel 16. The contact presser 34 is near the through hole 32C. The projecting dimension of the contact presser 34 is smaller than the thickness of the flange section 45B measured in the vehicular interior-exterior direction and a total of the thickness of the skin 40 and the projecting dimension of the contact presser 34 is greater than the thickness of the flange section 45B measured in the vehicular interior-exterior direction. The metal member may be generally deformed greatly near an insertion hole for a fixing member to be closer to a target member to be fixed. The configuration that the contact presser 34 is near the through hole 32C includes the following configuration. The contact presser 34 is away from the through hole 32C so as not to be contacted with the flange section of the grommet and the contact presser 34 is near the through hole 32C such that the distance between the door inner panel 16 and the front side wall mount portion 32BF can keep the thickness of the flange section.

According to such a configuration, with the front side wall mount portion 32BF (the mount portion) of the side wall member 32 being fixed to the door inner panel 16 (the vehicular metal member), the overlapping section 44C is pressed by the body portion 34D of the contact presser 34 toward the vehicular exterior side or toward the door inner panel 16 until the distance between the door inner panel 16 and the front side wall mount portion 32BF becomes same as the thickness of the flange section 45B of the grommet 45. The portion of the elastic layer 42 overlapping the overlapping section 44C is pressed to be thinner and the total of the projecting dimension of the contact presser 34 (the projecting dimension of the base section 34A from the mount base portion 32B) and the thickness of the skin 40 becomes same as the thickness of the flange section 45B when the front side wall mount portion 32BF is fixed to the door inner panel 16.

As illustrated in FIG. 6, the base section 44A of the skin extended portion 44 is pressed by the mount base portion 32B such that the thickness of the base section 44A is smaller than the thickness of the skin body portion 43. The overlapping section 44C is further pressed by the contact presser 34 so as to be thinner than the base section 44A. Accordingly, the skin 40 is surely contacted with the door inner panel 16. Since the contact presser 34 is arranged near the flange section 45B, the contact presser 34 can be formed with high accuracy so as to be deformed to have the dimension that is suitable for pressing the skin 40 toward the door inner panel 16 in relation to the thickness of the flange section 45B. According to such a configuration, the skin 40 is more surely contacted with the door inner panel 16.

In this embodiment, the front side wall mount portion 32BF (the mount portion) includes the mount base portion 32B having a plate shape and the contact presser 34 that projects from the vehicular exterior side surface of the mount base portion 32B toward the door inner panel 16. The contact presser 34 includes the base section 34A that projects from the mount base portion 32B and the contact section 34B that extends from the base section 34A along the surface of the mount base portion 32B. The skin extended portion 44 including the elastic layer 42 overlaps the contact section 34B. According to such a configuration, the elastic contact between the skin 40 and the door inner panel 16 is ensured.

In this embodiment, the contact section 34B extends from the base section 34A toward the side wall body portion 32A. The skin extended portion 44 overlaps the contact section 34B from the vehicular exterior side and at least a portion of the skin extended portion 44 is fixed to the front side wall mount portion 32BF. According to such a configuration, the base section 34A of the contact presser 34 is close to the grommet 45. This ensures stable fixing of the front side wall mount portion 32BF and the door inner panel 16 and stable contact between the skin 40 and the door inner panel 16.

In this embodiment, the electricity removal surface layer 41 is an electrically conductive fabric skin that is made of a knitted fabric obtained by knitting together with the electrically conductive fibers. The electricity removal surface layer 41 of this embodiment includes the electrically conductive fibers. The electricity removal surface layer 41 may include at least one of a synthetic resin sheet, a woven fabric, and a non-woven fabric each of which includes electrically conductive fibers. The electricity removal surface layer 41 may include any kinds of materials having various sense of touch and feel of material and users can be fully satisfied.

In this embodiment, the elastic layer 42 includes urethane foam including foaming resin. Since the urethane foam has a configuration of continuous bubbles, the pull handle member 30 covered with the skin 40 can be provided with sense of soft touch and the skin 40 can be elastically deformed relatively freely. According to such a configuration, feel of material of the skin 40 can be improved and the reliable electrical connection between the pull handle member 30 and the door inner panel 16 can be achieved.

In this embodiment, the pull handle member 30 is to be mounted on the vehicular interior side of the door inner panel 16 that is made of metal and configured as a part of the vehicular door 10. The pull handle member 30 is configured as a part of the door pull handle 24. With the pull handle member 30 including the above configuration, static electricity stored in a passenger who is seated on a vehicular seat flows to the door inner panel 16 by the passenger's touching of the pull handle member 30 for opening the door 10 when the passenger gets off the vehicle.

Second Embodiment

Figure 12:
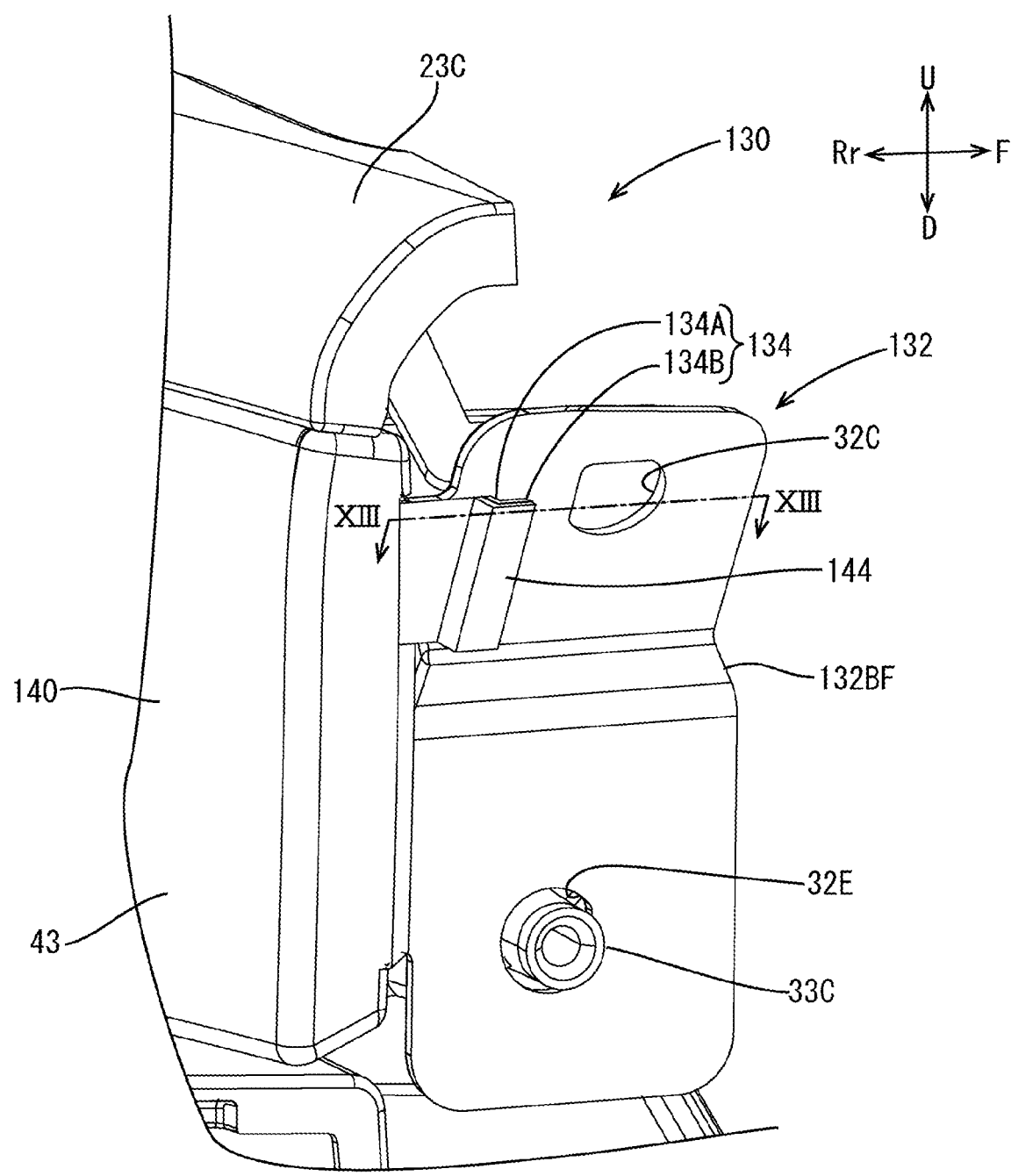
FIG. 12 is a perspective view of a portion of a pull handle member including a skin extended portion of a skin according to a second embodiment.
Figure 13:
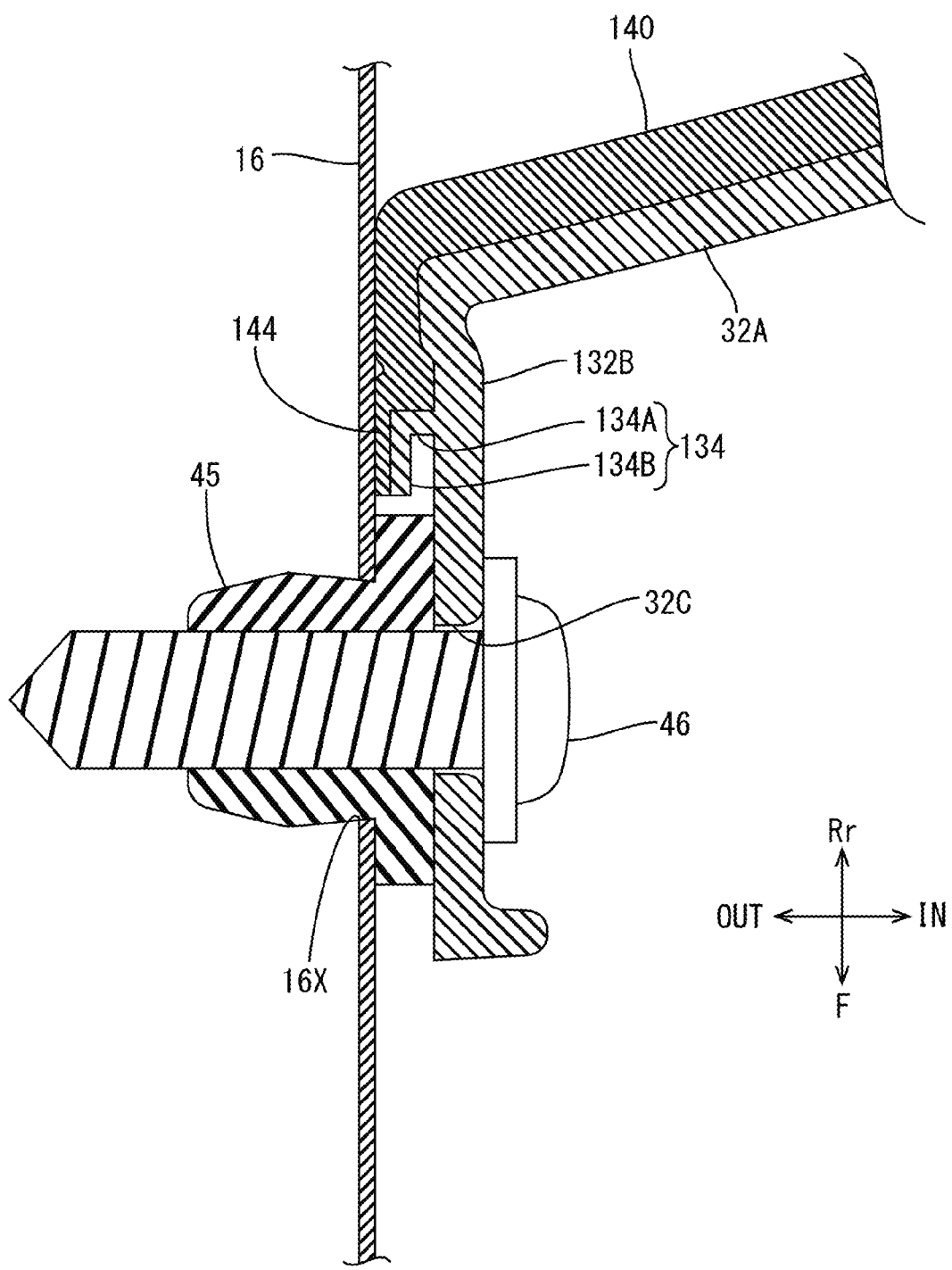
FIG. 13 is a cross-sectional view taken along XIII-XIII line in FIG. 12.

A pull handle member 130 (the vehicular interior component) according to a second embodiment will be described with reference to FIGS. 12 and 13. In this embodiment, configurations of a front side wall mount portion 132BF (the mount portion), a contact presser 134 (the projection member), and a skin extended portion 144 differ from those of the first embodiment. Other configurations and effects are similar to those of the first embodiment and will not be described.

The front side wall mount portion 132BF of a side wall member 132 includes a mount base portion 132B and the contact presser 134 that integrally projects from the mount base portion 132B. A base section 134A of the contact presser 134 that projects from the mount base portion 132B is closer to the side wall body portion 32A than the base section 34A of the first embodiment. A contact section 134B of the contact presser 134 extends from the base section 134A to be away from the side wall body portion 32A and closer to the upper through hole 32C. Namely, the contact section 34B of the first embodiment extends from the base section 34A toward the vehicular rear side and the contact section 134B of the contact presser 134 extends from the base section 134A toward the vehicular front side.

The skin extended portion 144 extends from the skin body portion 43 with a same width and overlaps the contact presser 134. The skin extended portion 144 has a width measured in the upper-bottom direction that is same as the dimension of the contact presser 134 measured in the upper-bottom direction. The skin extended portion 144 adheres to a portion of the mount base portion 132B, a vehicular rear side surface of the base section 134A, and a vehicular exterior side surface of the contact section 134B. According to such a configuration, the skin extended portion 144 can be entirely attached to the contact presser 134 without being separated from the contact presser 134. If a portion of the skin extended portion 144 is separated from the contact presser 134, the separated portion of the skin extended portion 144 may be attached to and separated from the contact presser 134 repeatedly during the vehicle's running and this crates sticky sounds or lowers adhesive strength for the skin extended portion 144. However, in this embodiment having the above configuration, such problems are less likely to be caused. Since the skin extended portion 144 is entirely attached and fixed to the contact presser 134 firmly, the skin extended portion 144 can be pressed toward the door inner panel 16 with a larger area. Thus, static electricity stored in the skin 140 can be smoothly removed.

OTHER EMBODIMENTS

The technology described herein is not limited to the embodiments described above with reference to the drawings. The following embodiments may be included in the technical scope. The technology described herein may be modified within the technical scope.

(1) In the above embodiments, the bottom body portion 33A of the pull handle member 30 is uncovered; however, the bottom body portion 33A may be covered with a skin. The skin covering the bottom body portion 33A may be the skin 40 having the static dissipative properties or may be a skin of a synthetic resin sheet (such as artificial skin) having electrical insulating properties.

(2) In the above embodiments, the side wall member 32, 132 includes the contact presser 34, 134 that project toward the door inner panel 16; however, the door inner panel 16 may include a contact presser projecting toward the side wall member 32, 132. The contact presser 34, 134 is configured such that the contact section 34B, 134B is slightly inclined toward the vehicular exterior side as it extends rearward and the contact section 34B, 134B is deformable in the vehicular interior-exterior direction. However, contact presser 34, 134 may have one of the inclined configuration or the deformable configuration or may not have both of them. In the configuration of the door inner panel 16 including the contact presser 34, 134, the contact presser 34, 134 may have one of the inclined configuration or the deformable configuration or may not have both of them.

(3) In the above embodiments, the pull handle member 30, 130 included in the vehicular door trim 20 is described as an example of the vehicular interior component. However, the configuration of the pull handle member according to the above embodiments may be included in a holding member that is included in a quarter trim and with which an occupant keeps his or her posture and an assist grip included in a ceiling interior component or a pillar garnish. Furthermore, the pull handle member 30, 130, which is an example of a vehicular interior component, may be included in a train, an amusement vehicle, an airplane, a helicopter, a ship, or a submarine.

The invention claimed is:

1. A vehicular interior component to be mounted on a vehicular metal member, the vehicular interior component comprising:
   a wall member including a wall body portion having a plate shape and a mounting portion that extends from the wall body portion and along the vehicular metal member and is to be fixed to the vehicular metal member; and
   a skin disposed on a portion of the wall member and including an electricity removal surface layer on a surface of the skin facing a vehicular exterior side, the electricity removal surface layer having static dissipative properties, the skin including a skin body portion that covers the wall body portion and a skin extended portion that extends from the skin body portion and covers a portion of the mounting portion, and the electricity removal surface layer of the skin extended portion being to be directly contacted with the vehicular metal member.

2. The vehicular interior component according to claim 1, wherein the skin further includes an elastic layer on the electricity removal surface layer and the elastic layer is opposite the wall member.

3. The vehicular interior component according to claim 2, wherein the elastic layer includes foaming resin.

4. The vehicular interior component according to claim 1, wherein
   the mounting portion includes a mount base portion having a plate shape and a projection member that projects from the mount base portion toward the vehicular exterior side and is covered with the skin extended portion, and
   the electricity removal surface layer of the skin extended portion that covers the projection member is to be directly contacted with the vehicular metal member between the projection member and the vehicular metal member.

5. The vehicular interior component according to claim 4, wherein
   the mount base portion includes a through hole through which a fixing member is inserted, the fixing member is inserted through the through hole in the mount base portion and a through hole in the vehicular metal member via a grommet,
   the grommet includes a tubular section that is fitted in the through hole of the vehicular metal member and a flange section that extends outward in a radial direction from the tubular section and is between the mount base portion and the vehicular metal member, and
   a projecting dimension of the projection member is smaller than a thickness of the flange section measured in a vehicular interior-exterior direction and a total of the projecting dimension of the projection member and a thickness of the skin is greater than the thickness of the flange section.

6. The vehicular interior component according to claim 4, wherein
   the projection member includes a base section that projects from the mount base portion toward the vehicular exterior side and a contact section that extends from the base section along the mount base portion, and
   the skin extended portion overlaps the contact section.

7. The vehicular interior component according to claim 6, wherein
   the contact section extends from the base section toward the wall body portion, and
   the skin extended portion overlaps the contact section from the vehicular exterior side and a portion of the skin extended portion is fixed to the mount base portion.

8. The vehicular interior component according to claim 6, wherein
   the contact section extends from the base section to be away from the wall body portion, and
   the skin extended portion continuously covers a portion of the mount base portion and the contact section.

9. The vehicular interior component according to claim 1, wherein the electricity removal surface layer includes at least one of a synthetic resin sheet, a woven fabric, a non-woven fabric, or a knitted fabric each of which includes electrically conductive fibers.

10. The vehicular interior component according to claim 1, wherein the vehicular interior component is a pull handle member of a door pull handle that is to be mounted on the vehicular metal member that is a door panel.

11. A vehicular interior component to be mounted on a vehicular metal member, the vehicular interior component comprising:
    a wall member including a wall body portion and a mounting portion that extends from the wall body portion and along the vehicular metal member and is to be fixed to the vehicular metal member, the mounting portion including a mount base portion having a plate shape and a projection member that projects from the mount base portion toward a vehicular exterior side, and a skin disposed on a portion of the wall member and having static dissipative properties, the skin including a skin body portion that covers the wall body portion and a skin extended portion that extends from the skin body portion and covers a portion of the mount base portion and the projection member from the vehicular exterior side such that the skin extended portion is between the projection member and the vehicular metal member.

12. The vehicular interior component according to claim 11, wherein the skin extended portion includes an overlapping section that overlaps the projection member and is between the projection member and the vehicular metal member, and the overlapping section has a thickness that is smaller than a thickness of other portion of the skin extended portion that does not overlap the projection member.

13. The vehicular interior component according to claim 12, wherein the projection member includes a base section that projects from the mount base portion toward the vehicular exterior side and a contact section that extends from the base section along the mount base portion and has a plate surface, and the contact section overlaps the overlapping section and the plate surface of the contact section is contacted with the overlapping section and the overlapping section is to be contacted with the vehicular metal member.

14. The vehicular interior component according to claim 11, wherein the mount base portion includes a through hole through which a fixing member is inserted and the through hole is near the projection member.

* * * * *